(12) United States Patent
Vijay et al.

(10) Patent No.: US 12,556,165 B2
(45) Date of Patent: Feb. 17, 2026

(54) CONTROL OF INDUCTOR SWITCHING (71) Applicant: Cirrus Logic International Semiconductor Ltd., Edinburgh (GB)

(72) Inventors: Vikas Vijay, Austin, TX (US); Eduardo Velarde, Austin, TX (US); Bryan Quinones, Austin, TX (US); Douglas J. W. Macfarlane, Edinburgh (GB); David Smith, Edinburgh (GB); Saurabh K. Singh, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 288 days.

(21) Appl. No.: 17/894,663

(22) Filed: Aug. 24, 2022

(65) Prior Publication Data

US 2024/0048128 A1 Feb. 8, 2024

Related U.S. Application Data (60) Provisional application No. 63/394,745, filed on Aug. 3, 2022.

(51) Int. Cl.
*H02M 1/08* (2006.01)
*H03K 3/012* (2006.01)

(52) U.S. Cl.
CPC .............. *H03K 3/012* (2013.01); *H02M 1/08* (2013.01)

(58) Field of Classification Search
CPC .... H03K 3/012; H03K 17/166; H03K 17/687; H02M 1/08; H02M 1/0029; H02M 1/0054; H02M 1/44
See application file for complete search history.

(56) References Cited

U.S. PATENT DOCUMENTS

| | | | |
|---|---|---|---|
| 5,390,070 A | 2/1995 | Niedermeier | |
| 9,214,833 B1* | 12/2015 | Kim | H02J 1/10 |
| 2003/0039128 A1* | 2/2003 | Cohen | H02M 3/33571 |
| | | | 363/20 |
| 2006/0226820 A1* | 10/2006 | Farkas | G05F 1/573 |
| | | | 323/276 |
| 2009/0016083 A1* | 1/2009 | Soldano | H02M 3/33592 |
| | | | 363/20 |
| 2014/0253186 A1* | 9/2014 | De Geeter | H03K 17/6871 |
| | | | 327/110 |
| 2015/0137777 A1* | 5/2015 | Chen | H02M 3/1588 |
| | | | 323/271 |
| 2021/0067044 A1* | 3/2021 | Barchowsky | H02M 1/0095 |
| 2021/0217688 A1* | 7/2021 | Sato | H01L 23/04 |

FOREIGN PATENT DOCUMENTS

EP 3584932 A1 12/2019

OTHER PUBLICATIONS

International Search Report and Written Opinion of the International Searching Authority, International Application No. PCT/GB2023/051632, mailed Sep. 21, 2023.

* cited by examiner

*Primary Examiner* — Sibin Chen
(74) *Attorney, Agent, or Firm* — Jackson Walker L.L.P.

(57) ABSTRACT

Methods and apparatus for controlling a switch transition in an inductive switching circuit are disclosed. A switch driver is configured to receive an indication of current through a diode associated with a first switch and dynamically control a switch transition of a second switch based on the indication of current, so as to reduce the switch transition time, when possible, whilst maintaining a voltage transient due to the switch transition within an acceptable range.

15 Claims, 5 Drawing Sheets

CONTROL OF INDUCTOR SWITCHING

FIELD OF DISCLOSURE

The field of representative embodiments of this disclosure relates to methods, apparatus and/or embodiments concerning or relating to control of inductor switching, in particular for controlling the timing, or rate or speed of switch transitions.

BACKGROUND

There are various applications in which an electronic circuit may be switched between different switch states to provide a controlled output, and in some cases the circuit may include an inductor coupled to a switching node and/or there may be some significant inductance coupled to a switching output node. One example of a such a circuit may be an inductive DC-DC converter, such as a boost converter or a buck converter or the like.

Figure 1:
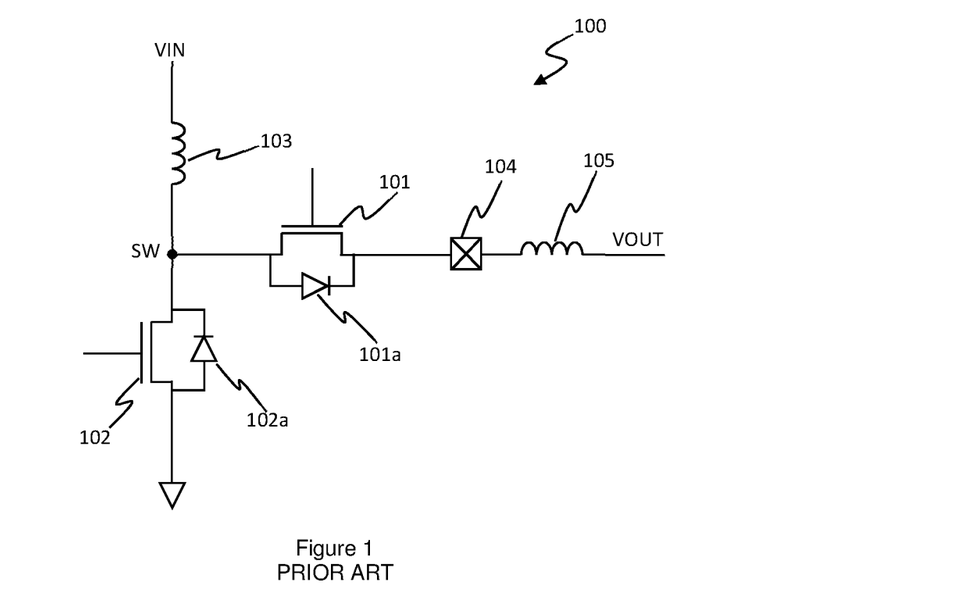
FIG. 1 illustrates one example of a boost converter.

FIG. 1 illustrates one example of an inductive direct-current to direct-current (DC-DC) converter 100, in this case a boost converter, for receiving an input voltage VIN and providing an output voltage VOUT to a load (not illustrated). The boost converter of FIG. 1 comprises transistor switches 101 and 102 and an inductor 103. For a boost converter, the inductor 103 is connected between the input voltage VIN and a switching node SW, the switch 101, which may be referred to as the high-side switch, is connected in a switch path between the switching node SW and an output 104 for the output voltage VOUT and the switch 102, which may be referred to as the low-side switch, is connected in a switching path between the switching node SW and a defined voltage, in this example ground. In use, as will be understood by one skilled in the art, the boost converter alternates between two switch states. In one of these switch states, the high-side switch 101 is off (or open), i.e. non-conductive, and the low-side switch 102 is on (or closed), i.e. conductive, so that the inductor is electrically connected between the input voltage and ground and the inductor current IL increases. In the other state, the high-side switch 101 is on and the low-side switch 102 is off, so as to electrically connect the input voltage to the output 104 via the inductor 103, so that the energy stored in the inductor provides a boosted voltage at the output 104. By alternating between these states with a controlled duty cycle, a desired output voltage VOUT can be provided.

When switching between the two states, it is important that the high-side and low-side switches 101 and 102 are not both sufficiently on at the same time to allow a significant shoot-through current. However, practically it will take a certain amount of time to fully turn off the relevant transistor switch, i.e. to transition from being fully on to being fully off. Therefore, there may be a period, often referred to as a dead-time or non-overlap period, following initiating turn off of one of the switches, which is sufficient to allow the relevant switch to fully turn off, before initiating turn on of the other switch. The transition between switch states may occur, however, when a significant current IL is flowing in the inductor, which will continue to flow during the state transition. As will be understood by one skilled in the art, the high-side and low-side transistor switches 101 and 102 will generally have inherent body diodes 101a and 101b. As the relevant switch is turned off, the inductor current IL may thus increasingly flow via a body diode of one of the switches, until the other switch turns on.

Generally, it is desirable to turn the relevant switches off and on as quickly as possible, to minimise switching conduction losses due to current flowing through a switch which is only partly on and thus has a relatively high resistance. Also, conduction via a body diode of one of the switches is generally more lossy than conduction through the relevant switch when fully on. The time taken for the relevant transistor switch to turn off or on depends on the switch drive signal applied, e.g. the gate drive strength for a MOS transistor. However, a rapid change in current through the high-side or low-side switching paths can potentially result in voltage spikes due to parasitic inductances associated with the switching paths. Such voltage spikes can add to the voltage stress on components, such as the switches, and therefore generally the rate of turn on or off of the switches may be set so that the expected voltage transient would not exceed a safe operating limit for the worst case expected operating conditions.

Similar issues can arise for other switching circuits that include significant inductance, e.g. other inductor-based DC-DC converters, or a class-D driver or other switching driver for driving an inductive load.

SUMMARY

Embodiments of the present disclosure relate to methods and apparatus that at least mitigate at least some of these issues.

According to an aspect of the disclosure, there is provided a switch driver for controlling a switch transition in an inductive switching circuit. The switch driver is configured to receive an indication of current through a diode associated with a first switch and dynamically control a switch transition of a second switch based on said indication of current, so as to reduce the switch transition time, when possible, whilst maintaining a voltage transient due to the switch transition within an acceptable range.

The first switch may be a transistor, and the diode associated with the first switch is a body diode of the first switch.

In some examples, the switch driver may be configured to dynamically control a slew rate of the switch transition of the second switch based on the indication of current. The indication of current may be a portion of current through the diode which is tapped from the diode.

In some implementations, the indication of current may be fed-back in a closed loop to vary a drive strength of a drive signal applied to the second switch. The second switch may be a Negative channel Metal-Oxide Semiconductor (NMOS) switch and the indication of current may be fed-back to a gate terminal of the NMOS switch so as to dynamically control a slew rate of turn off of the NMOS switch.

In some embodiments, the indication of current may be monitored by a driver controller to provide open-loop control of the slew-rate. The driver controller may comprise a comparator configured to compare the indication of current to a threshold. An output of the comparator may control a drive strength of a drive signal applied to the second switch. The switch driver may be configured to dynamically control the slew rate of a turn off switch transition of the second switch, so as to reduce the slew rate if the output of the comparator indicates that the indication of current exceeds the threshold.

The switch driver may be configured to control the timing of initiation of a turn on switch transition of one of the first and second switches based on the indication of current through said diode associated with the first switch. The switch driver may be configured to detect the onset of the current through the diode associated with the first switch to trigger said turn on switch transition of the one of the first and second switches. The switch driver may be further configured to receive an indication of current through the relevant one of the one of the first and second switches that is triggered to turn on and may be configured to dynamically control the switch transition of the second switch also based on the indication of current through that one of the one of the first and second switches that is triggered to turn on.

The switch transition of the second switch may be a turn off transition, and the switch driver may be further configured to control the timing of initiation of a turn on switch transition of the first switch based on said indication of current through the diode associated with the first switch.

In some embodiments, the inductive switching circuit comprises a DC-DC converter or a class-D driver.

In another aspect, there is provided a method of controlling a switch transition in an inductive switching circuit. The method comprises providing an indication of current through a diode associated with a first switch, and dynamically controlling a switch transition of a second switch based on said indication of current so as to reduce the switch transition time when possible whilst maintaining a voltage transient due to the switch transition within an acceptable range.

The first switch may be a transistor, and the diode associated with the first switch may be a body diode of the first switch. The indication of current may be a portion of current through the diode which is tapped from the diode.

In some examples, the indication of current may be fed-back in a closed loop to vary a drive strength of a drive signal applied to the second switch. In some examples, the indication of current may be monitored by a driver controller to provide open-loop control of the slew-rate.

In a further aspect there is provided a switch driver for controlling a switch transition of a first switch in an inductive switching circuit, the switch driver being configured to: receive an indication of current through a replica device, where the replica device is a scaled replica of the first switch which is driven with a drive signal corresponding to a first driver signal for the first switch; and dynamically control a slew rate of a switch transition of the first switch based on said indication of current so as to reduce the switch transition time when possible whilst maintaining a voltage transient due to the switch transition within an acceptable range.

In a yet further aspect, there is provided a switch driver for controlling a switch transition of a first switch in an inductive switching circuit, the switch driver being configured to: compare an indication of voltage at a switching node to a first threshold; and dynamically control a slew rate of a switch transition of the first switch based on said comparison so as to reduce the switch transition time when possible whilst maintaining a voltage transient due to the switch transition within an acceptable range.

It should be noted that, unless expressly indicated to the contrary herein or otherwise clearly incompatible, then any feature described herein may be implemented in combination with any one or more other described features.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The description below sets forth example embodiments according to this disclosure. Further example embodiments will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Embodiments of the disclosure relate to methods and apparatus for controlling switching in inductive switching circuits, and in particular to dynamic control of a switch transition.

As noted above, in inductive switching circuits, such as the boost converter described in FIG. 1, the circuit may be alternated between different switch states to provide a controlled output. When switching, to transition between states, there may be a dead time between initiating turn off of one switch before initiating turn on of the other switch, e.g. to prevent current shoot through, and the rate of turn off and turn on of the switches may be limited, so as to limit the extent of a voltage spike that can occur due to a change in current through an inductance connected to one of the switching paths during the switch transition.

For example, referring back to FIG. 1, this figure illustrates that there is an inductance 105 coupled to the output 104, for instance due (at least partly) to parasitic inductance associated with the output signal path, e.g., where the boost converter is implemented as an integrated circuit connected to a printed circuit board (PCB), there may be parasitic inductance from conductive traces on a PCB connected to the output 104. The presence of inductance 105 can result in an induced voltage spike if the current flowing through the output path, and hence through the inductance 105, changes rapidly.

When the boost converter is in the switch state with the high-side switch 101 off and the low-side switch 102 on, current will flow from VIN, through the inductor 103 and the low-side switch 102. When the low-side switch 102 turns off, the voltage at the switching node SW will rise until the body diode 101a of the high-side switch 101 becomes forward biased and then the inductor current IL will increasingly flow via this body diode to the output 104, and on to the load. The rapid increase in current through the parasitic inductance 105 can cause a positive voltage spike at the output 105, which in turn can lead to an increase in the voltage at the node SW. The magnitude of this voltage spike depends on the rate of change of current dI/dt through the parasitic inductance 105, which in turn depends on the magnitude of the inductor current IL and how quickly the low-side switch 102 is turned off.

When the high-side switch 101 is subsequently turned on, the current will cease flowing via the body diode 101*a* and will flow via the channel of the high-side switch 101, and there will be no significant variation in current through the parasitic inductance 105, and thus no voltage spike. Likewise (providing the current through inductor 103 has not reversed direction) when the high-side switch 101 is then later turned off, the inductor current IL will then increasingly flow via the body diode 101*a* of the high-side switch, with no significant change in current through the parasitic inductance 105.

However, when the low-side switch 102 is then turned on, the inductor will increasingly flow via the low-side switch 102, rather than the body diode 101*a* of the high-side switch 101. This change in current flow can lead to a rapid decrease in the current flowing through the parasitic inductance 105, which can result in a voltage spike at the output 104. In this case, the voltage spike at the output 104 would be a negative spike, but due to the interaction of the inductance 105 with some capacitance, which may be a parasitic capacitance (not illustrated), the voltage spike may result in oscillation or ringing in voltage at the output. The negative voltage spike results in a voltage difference across the inductance 105, and when the current through the body diode 101*a* drops to zero, this voltage across the inductor may lead to a reverse current through the parasitic inductor 105, which builds until the voltage across the inductor is zero. At that point, however, there may still be a current through inductance 105, and this current may cause the voltage at the output to positively increase, until the current stops flowing, in which case the positive voltage may then drive a positive current through the inductance 105. The voltage at the output 104 may thus oscillate or ring for a while until the current through the inductance 105 decays to zero and remains stable. Again, the magnitude of the initial voltage spike and subsequent voltage ringing depends on the rate of change of current through the inductance 105, which depends on how quickly the low-side switch 102 is turned on.

The discussion above assumes that the inductor current IL remains positive throughout the whole duty cycle, but it will be understood that if a reverse inductor current to flow at any point during the state transition, the relevant body diode 101*a* or 101*b* that carries the reverse current may differ, but again any rapid change in current through inductance 105 would result in a voltage spike.

Also, it will be appreciated that there may also be some inductance between the second switch 102 and ground, e.g., a parasitic inductance due to conductive traces on a PCB ground path. Any rapid changes in current through such an inductance may also lead to a voltage spike.

These voltage spikes can add to voltage stress across components of the boost converter, for instance the switches 101 and/or 102. As noted, the magnitude of the voltage spike depends on the rate of change of current, which itself depends on the magnitude of the inductor current IL at the time of switching and also the rate of turn on or turn off of the relevant switch. Generally, the drive signal that determines the rate of turn on or off of the relevant switch is fixed and set so that, for the maximum expected inductor current IL, the resulting voltage spike would not exceed a maximum allowable voltage tolerance, e.g. a drain-source voltage across the relevant transistor.

In embodiments of the present disclosure, at least one switch transition, turn on and/or turn off, of at least one of the switches may be dynamically controlled based on an indication of current flowing in one of the switching paths. In some embodiments, the dynamic control may dynamically control a switch drive signal, e.g. the gate drive, based on such an indication of current so as to limit, when required, the rate of change of current, and hence the magnitude of any voltage spike, to not exceed a defined limit. This control may allow the relevant switch to be turned on or off as fast as possible, without exceeding the defined limit, i.e. whilst maintaining the voltage spike within an acceptable range.

In some embodiments, the indication of current for controlling turn on or turn off of one of the switches may be an indication of the current flowing in a diode associated with the other switch, e.g. the turn on or turn off of the low-side switch may be based on an indication of the current flowing via the diode associated with the high-side switch or vice versa. The diode may conveniently be the body diode of the relevant transistor switch, e.g. a body diode of the high-side transistor switch, but in some embodiments, a separate diode may be implemented in parallel with the relevant switch, as part of the switching path, to allow for current flow during a state transition, and the indication of diode current may thus be an indication of current through such a separate diode. As described above, the voltage spikes of concern occur when the current through the switching paths changes rapidly, which occurs when one of the switches is being turned on or off, and this switching results in a change in current flow via the body diode of the switch of the other switching path.

Figure 2:
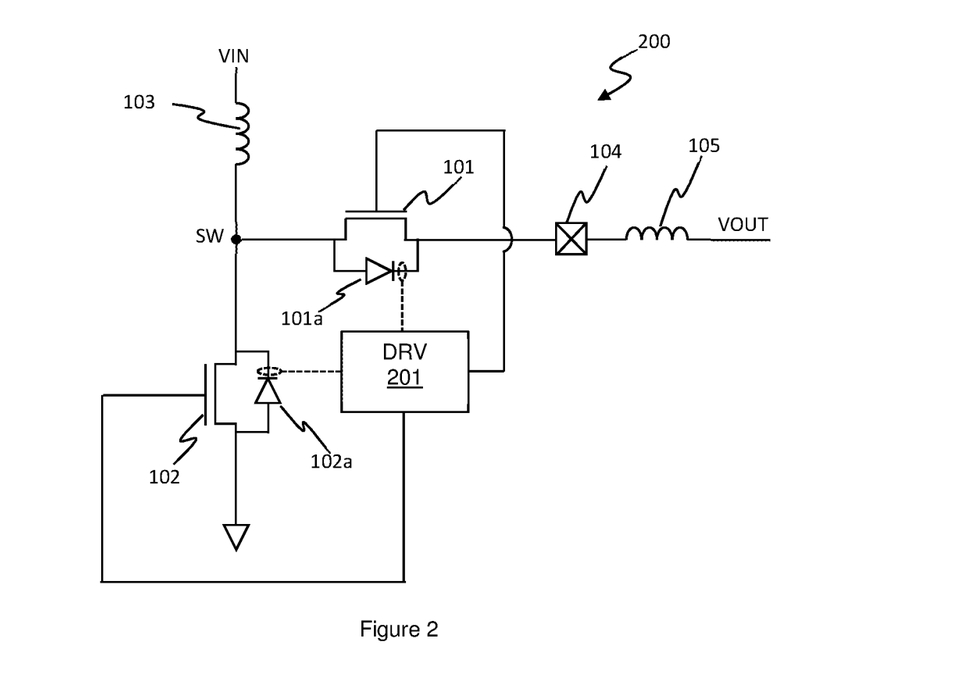
FIG. 2 illustrates an example of a boost converter with a switch driver for dynamically controlling the rate of a switch transition.

FIG. 2 illustrates generally an example of a switching inductor circuit 200 according to an embodiment, in this case a boost converter in which similar components as discussed with reference to FIG. 1 are identified by the same references. FIG. 2 illustrates that a driver 201 is provided for generating the switch drive signals for the high-side and low-side switches 101 and 102 respectively, where the driver 201 is configured to dynamically control at least one of the switch drive signals for turn on or turn off of the relevant switch.

Thus, for example, consider the state transition from the state with the high-side switch 101 off and the low-side switch 102 on, to the state with the high-side switch 101 on and the low-side switch 102 off. The state transition may be triggered by a converter controller (not illustrated). In response to the trigger, the driver 201 will generate a drive control signal to turn the low-side switch 102 off. During the turn off of the low-side switch 102, the driver controller 201 may receive an indication of the current through diode 101*a* associated with the high-side switch and, based on this indication of diode current, control the drive signal applied to the low-side switch 102 so as to dynamically control the rate of turn off (i.e. the slew rate of the switch transition) so as to generally provide as fast a turn off as possible, whilst maintaining any voltage transient within an acceptable range.

There are various ways in which the switch driver 201 may control the relevant switch drive signal based on the indication of diode current. In some embodiments, there may be a closed loop control so as to automatically vary the switch drive signal with the indication of diode current. In some embodiments, open-loop control may be implemented.

Figure 3:
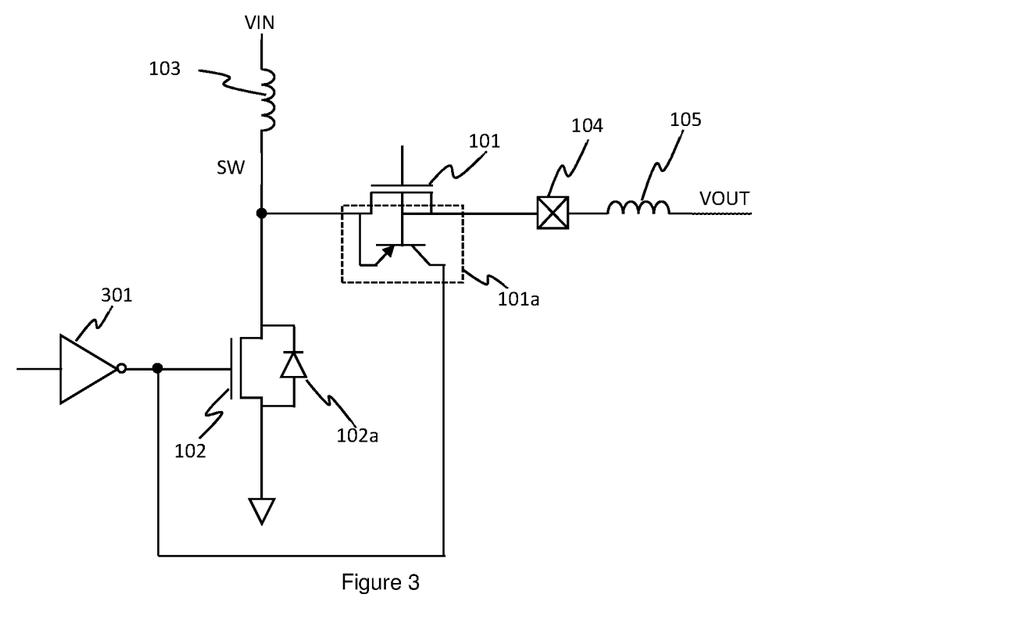
FIG. 3 illustrates an example of a switch driver with closed loop control.

FIG. 3 illustrates one example of how the turn off of the low-side switch 101 (in this example an NMOS device) may be dynamically controlled with closed loop control. FIG. 3 illustrates that a low-side switch driver 301 generates a drive signal for the gate of the low-side switch. FIG. 3 also illustrates the high-side transistor 101 as having an associated bipolar pnp (which comprises the diode 101*a*) and illustrates that the collector of this bipolar pnp may be tapped to provide a current to the gate of the low-side switch 102. One skilled in the art will be aware that there may be multiple ways in which the relevant current may be tapped from the high-side transistor 101 to provide an indication of the current flowing through the associated diode 101a.

In use, when the low-side switch 102 is on, all the inductor current IL will flow via the low-side switch 102. Following a trigger for a state transition, the low-side switch driver 301 will generate a drive signal with a defined strength so as to turn the low-side switch 102 off, which for an NMOS will drive the gate voltage low. As the low-side switch 102 turns off, the voltage at node SW will rise and current will begin to flow in the emitter of the bipolar pnp. An equal current will flow in the collector, and the tapped current from the collector will flow into the gate of the low-side switch 102. This tapped current supplied to the gate of the low-side switch 101 effectively reduces the strength of the discharge drive signal from the low-side switch driver 301 and provides negative feedback so as to limit the rate of turn off of the low-side switch. The strength of the drive signal applied to the gate of the low-side switch 102 may thus be relatively high, so as to turn the second switch 102 off quickly, unless and until a significant current starts to flow via the collector of the pnp which automatically results in the drive strength being reduced so as to limit the rate of turn off. The collector current may be scaled by area so as to tap a desired portion of the current through the diode 101a of the high-side switch 101 so as to provide a desired feedback strength.

Figure 4:
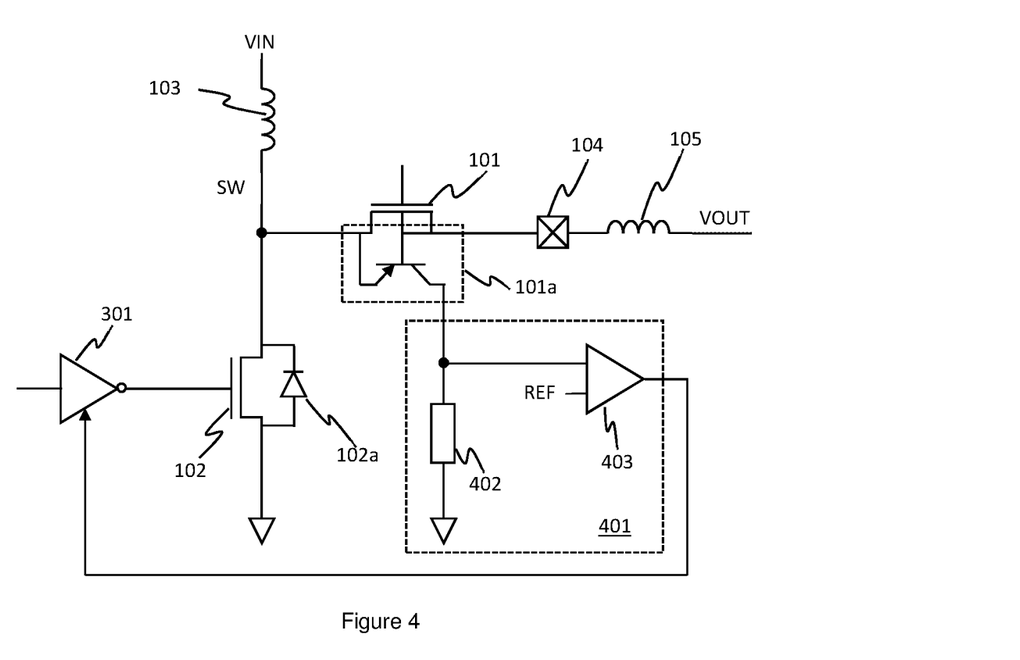
FIG. 4 illustrates an example of a switch driver with open loop control.

FIG. 4 illustrates one example of how the turn off of the low-side switch 101 (in this example an NMOS device) may be controlled with open loop control. FIG. 4 (like FIG. 3) illustrates that a low-side switch driver 301 generates a drive signal for the gate of the low-side switch 102, and that the high-side transistor 101 has an associated bipolar pnp, with the collector of the bipolar pnp being tapped to provide an indication of current through the diode 101a. In the example of FIG. 4, however, this indication of current is monitored by a drive controller 401 so as to control the turn off of the low-side switch 102. In this example, the collector current is passed through a resistor 402 to generate a corresponding voltage which is compared to a reference voltage REF by comparator 403. If the collector current causes the monitored voltage to exceed the reference REF, the comparator 403 output trips to activate some control over the slew rate, for example by reducing the drive strength of the low-side switch driver 301, so as to reduce the rate of turn off of the low-side switch 102.

The relevant reference voltage REF may be set with regard to the resistance of resistor 402 so that the comparator trips at a certain desired level of diode current. The relevant threshold may be set so as to minimise the effect of static offset and transient delays. In some embodiments, the value of the reference voltage may be programmable.

Whilst the closed loop control discussed with reference to FIG. 3 may provide a very simple feedback control mechanism, the feedback should be implemented so as to avoid introducing any significant stability issues. The open loop control discussed with reference to FIG. 4 may avoid any such stability issues, and the output of comparator 403 provides a digital control signal for controlling the turn off of the low-side switch 102. Also, as mentioned, the diode current at which the slew rate control is initiated may be programmable by varying the voltage reference REF and/or the resistance of the resistor 402.

It will be understood that FIG. 4 illustrates just one example of a suitable drive controller 401, which may be implemented using relatively small and low-cost components, but that other ways of monitoring the indication of the diode current and/or controlling the drive of the low-side switch 102 may be implemented.

It should also be understood that whilst FIGS. 3 and 4 illustrates control over the turn off of the low-side switch, the same principles may be used to control turn on of the low-side switch, although, in that case, where the low-side switch is an NMOS device, slowing down the rate of turn on of the low-side switch 102 may involve reducing a positive drive current to the gate. Thus, for the closed loop control, the tapped collector current would not be applied directly to the gate of the low-side switch 102, but used to control transfer charge from the gate, e.g. by utilising a suitable current mirror arrangement or the like.

It will also be understood that, as noted above, for a boost converter with a positive current, turn on and turn off of the high-side switch 101 may not lead to any rapid change in current in the switching paths, but if a reverse current were to flow, the same principles could be applied to control turn on and turn off of the high-side switch 101 by monitoring the extent of diode conduction via the diode of the low-side switch. It will also be understood that the same principles could be applied to other inductive switching circuits, such as buck converters or class D amplifiers or the like. In general, at least one switch transition of at least one switch, e.g. a transition of a high-side switch 101 and/or a transition of a low-side switch 102, may be controlled based on monitoring current of a diode associated with another relevant switch, e.g. the low-side switch 102 or the high-side switch 101 as appropriate.

In some embodiments, the indication of the diode current may additionally or alternatively be used, during a state transition, to determine when to turn on one of the switches after initiating the switch transition to turn the other switch off (e.g. to determine when the high-side switch should be turned on after initiating turn off of the low side switch).

As noted above, generally a defined dead time is implemented between initiating turn off of one of the switches and subsequent turn on of the other switch, to avoid the risk of both switches being in a low resistance state at the same time. In embodiments of the present disclosure, however, as the relevant switch is turned off, the onset of diode conduction may be used to control timing of turn on of the other switch.

For instance, for a boost converter such as illustrated in FIG. 2, the indication of diode current may be used by driver 201 to not only control the rate of turn off of the low-side switch 201 but also to control when subsequently to initiate turn on the high-side switch 101.

Figure 5:
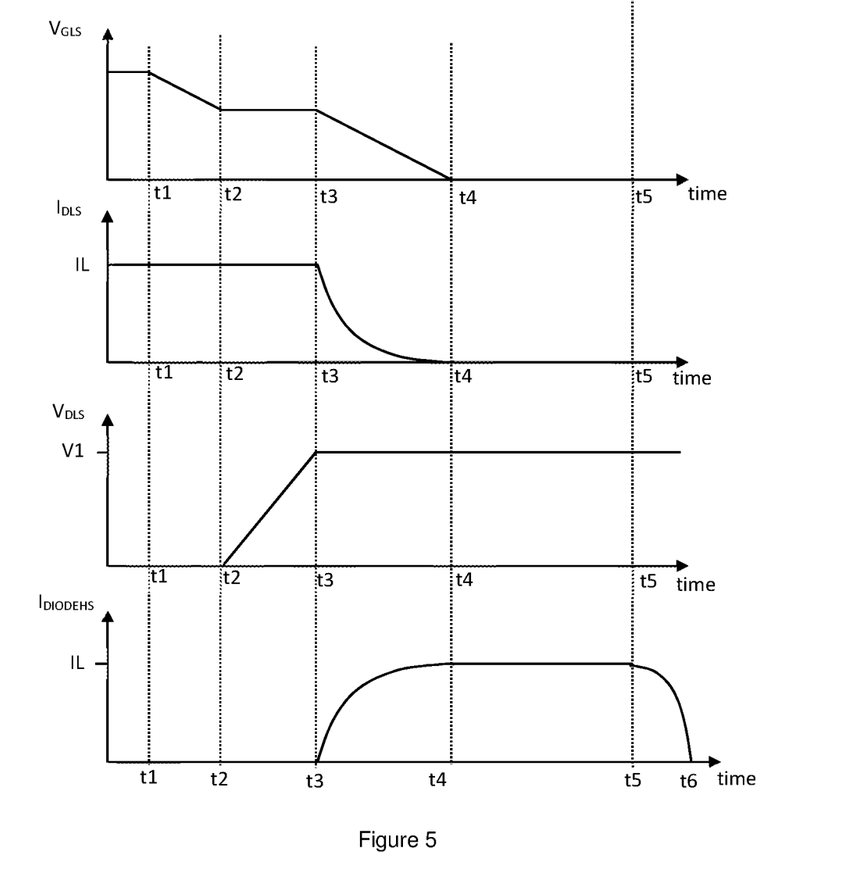
FIG. 5 illustrates example waveforms associated with a switch transition in a boost converter.

FIG. 5 illustrates some example waveforms for the boost converter for a transitioning the low-side switch 102 from on to off, whilst the high-side switch 101 remains off, as would be conventional. FIG. 5 illustrates the gate voltage of the low-side switch $V_{GLS}$, the drain current of the low-side switch $I_{DLS}$, the drain voltage for the low-side switch $V_{GLS}$, and the diode current $I_{DIODEHS}$ through the diode 101a of the high-side switch 101. It will be understood that the waveforms illustrated in FIG. 5 are for illustrative purposes only and are simplified or idealised for clarity.

Before the start of the state transition at t1, the gate voltage of the low-side switch $V_{GLS}$ is high and the low-side switch 102 is fully on. The inductor current IL flows via the low-side switch 102. In this state, with the low-side switch 102 on and the high-side switch 101 off, the inductor current IL will be increasing, but over the timescale of the switch transition illustrated, this change in the inductor current IL may be relatively low (and thus will be ignored for clarity).

At time t1, the state transition is initiated, and the low-side 102 switch starts to turn off. The driver for the low-side switch 102, e.g. driver 201, may thus start to drive the gate voltage of the low-side switch $V_{GLS}$ low. Initially, the low-side switch 102 will still be able to pass all the inductor current IL, albeit with an increased resistance. At time t2 however, the low-side switch 102 may not be able to pass all the inductor current without an increase in drain voltage. Thus, the drain voltage starts to rise. At this point in the transition, coupling of the drain gate capacitance means that the rate of change of the gate voltage slows down and the gate voltage may become substantially constant (sometimes referred to as the Miller plateau). FIG. 5 illustrates that the drain current $I_{DLS}$ of the low-side switch 102 may remain substantially at the level of the inductor current—in practice however for the drain voltage to rise, the drain current of the low-side switch 102 may be slightly less than the inductor current IL. The drain voltage rises until time t3 when the drain voltage is a diode voltage above the output voltage Vout and the diode 101a of the high-side switch 101 becomes forward biased and starts conducting. As the gate voltage $V_{GLS}$ is still being driven low, the gate voltage then continues to drop and the drain current of the low-side switch 102 drops, with the inductor current IL increasingly flowing via the diode 101a of the high-side switch 101, until a time t4 when all the inductor current is flowing via the diode 101a.

Conventionally, the high-side switch would only be turned on at some later time, t5, at which point the inductor current IL would increasingly flow via the channel of the high-side switch 101 and the diode conduction will cease.

In embodiments of the disclosure, the high-side switch 101 may, instead, be turned on after diode conduction is detected, i.e., any time from t3 in the illustrated waveforms. Once the diode 101a starts conducting, the low-side switch 102 will pass less than the full inductor current IL. If the high-side switch 101 is then turned on at this point, there will be no shoot through current, the low-side switch 102 will continue to pass a reducing amount of current as the gate voltage drops, with the difference between the inductor current and the drain current of the low-side switch flowing via a combination of the diode 101a and the high-side switch 101 as it turns on.

The onset of diode conduction may be detected in a variety of ways, for instance using the drive controller 401 illustrated in FIG. 4, with the reference voltage REF being set to an appropriate level such that the comparator 403 triggers once a defined collector current flows so as to reliably indicate diode conduction. In some embodiments, the drive controller 401 may thus monitor the collector current against multiple thresholds, where a first threshold indicative of diode conduction is used to trigger the turn on of the high-side switch 101 and at least a second threshold may be used to determine when to apply drive strength control for the turn off of the low-side switch 102.

The onset of conduction of the diode 101a may thus be used as a trigger to turn the high-side switch 101 on, without a risk of current shoot through. Turning the high-side switch 101 on at this point may, however, reduce the amount of conduction via the diode which may be beneficial in terms of reducing power loss due to conduction via the more resistive diode, but also reducing the amount of substrate current which may interact with other circuitry and/or reducing the requirements for guard rings, with associated circuit area requirements.

In this case, the high-side switch 101 may thus start to turn on and start passing some of the current whilst the low-side switch 102 is still turning off. Thus, as the low-side switch 102 progressively turns off, the required current may start to be passed by both the high-side switch 101 and its body diode 101a in parallel until the high-side switch 101 is sufficiently on so that all the current passes via the high-side switch 101. In this case, the rate of turn-off of the low-side switch 102 still determines the rate of change of current through the switching paths, and hence through the inductance 105, but monitoring the current through the body diode 101a during the turn off of the low-side switch 102 may provide an indication of part of the overall current.

In such a case, therefore the current through the high-side switch 101 may additionally be monitored, with the rate of turn off of the low-side switch 102 being controlled based on the combined current through the high-side switch 101 and the associated diode 101a. There are various ways that the current through the high-side switch 101 could be monitored, for instance by providing a sense device in parallel with the high-side switch 101 to monitor the current. The rate of turn-off of the low-side device 102 may then be controlled in the similar manner as discussed above based on the combined current through the high-side switch 101 and associated diode 101a.

Similar principles may be applied for other state transitions, e.g. for the other state transition for a boost converter where the high-side switch 101 turns off and the low-side switch 102 turns on, or for different state transitions for other inductive switching circuits. Where one switch is turned off before another switch is turned off, an indication of current through the relevant diode that carries the current as the relevant switch turns off may be monitored, and the onset of diode conduction used to trigger turn on of the other switch.

The embodiments discussed with reference to FIGS. 2 to 4 monitor an indication of current through at least one of the switching paths by tapping a current from a diode of one of the switching paths. This current monitoring provides a convenient indication of the extent of any slew-rate control required and also inherently indicates the time at which the slew-rate control is needed, which may allow the slew-rate to be varied throughout the duration of the switch transition and indicates that the slew-rate need only be limited for part of the switch transition. The diode current may additionally or alternatively be used to control timing of the switch transitions to minimise the dead time between initiating turn off of one switch and subsequent turn on of the other switch. In this case, as the one switch may still be turning off whilst the other switch starts to turn on, the relevant diode current may be combined with a measure of the current through the associated switch. Embodiments of the present disclosure involve the controlling of switching using a diode current.

However, in some embodiments, the slew-rate may be dynamically controlled in other ways. In some embodiments, the slew-rate of the switch transition may be controlled based on an indication of current in the switching paths which is obtained by monitoring the current through a replica device, where the replica device provides an indication of the current through one of the switches. The current through the replica device may be monitored and used to dynamically control switching of the relevant switch.

Figure 6:
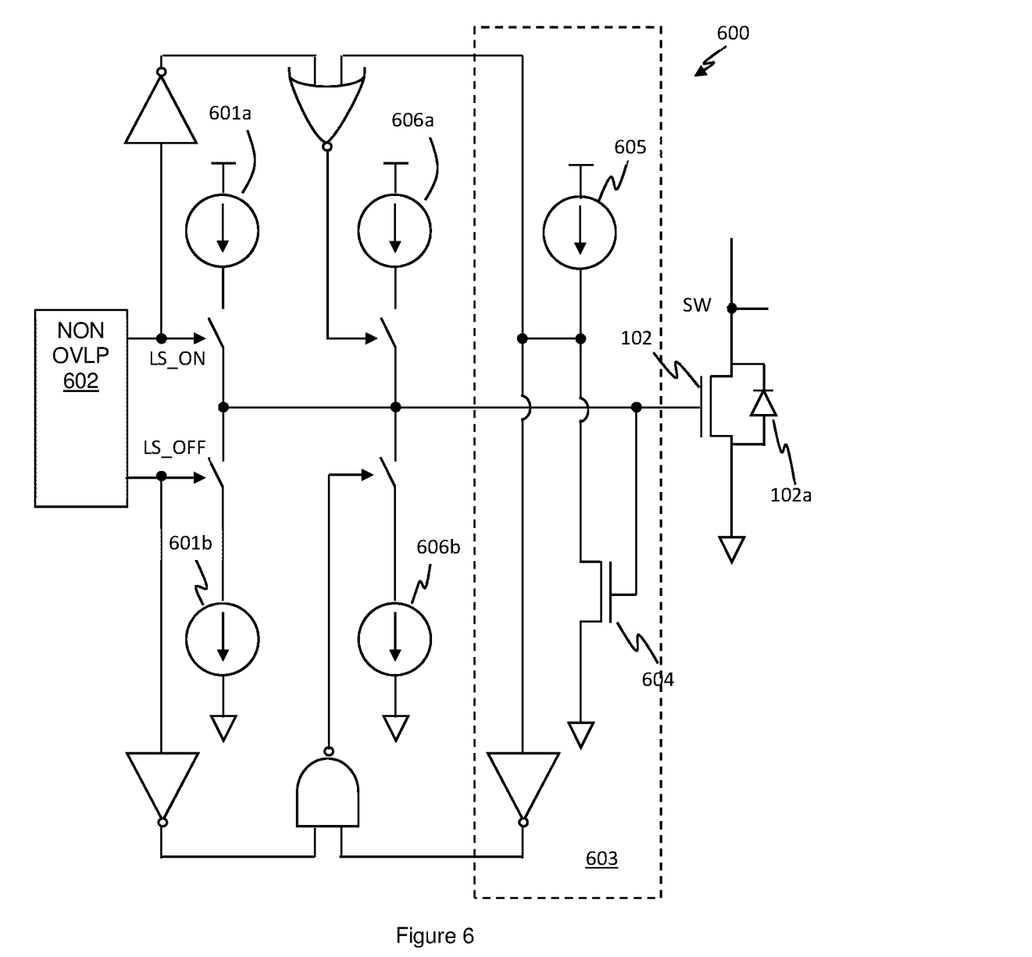
FIG. 6 illustrates an example of switch drive control circuitry with a replica device.

FIG. 6 illustrates one example of switch driver circuitry 600 for dynamically controlling one of the switches, in this example the low side switch 102, but similar principles may be applied to controlling the high-side switch 101 if desired. FIG. 6 illustrates that the gate of the low-side switch 102 may be selectively driven with a gate charge current from current source 601a or with a gate discharge current from current source 601b. The term current source shall be taken to refer to an element that provides a defined current, whether positive or negative, and thus the term current source as used herein will cover elements that provide current sink functionality. The current sources 601a and 601b may be configured to provide a defined current strength when active so as to provide a first rate of change of turn on or turn off for the low-side switch 102. The relevant current source 601a or 601b may be selected by respective control signals LS_ON and LS_OFF, which may be generated by a non-overlap controller in response to a control input (not illustrated) so as to have a short non-overlap period so that both current sources are not connected to the gate at the same time.

In addition, the switch driver circuitry 600 comprises a current monitoring block 603. The current monitoring block 603 comprises a replica device 604, which is a scaled replica of the low side switch 102, e.g. with a channel width of W/N where W is the width of the channel of the low-side switch 102 and N is the scaling ratio. The gate of the replica device 604 is driven with the gate drive signal for the low-side switch 102. In use, the current of the replica device 604 may thus provide an indication of the current through the low-side switch 102 which may be used to selectively vary the drive strength applied to the gate of the low-side switch.

In the example of FIG. 6, the current through the replica device 604 is effectively compared to a reference current, which corresponds to the inductor current IL at the time of the switch transition, scaled by the scaling ratio N, i.e. the reference current equals IL/N. As illustrated in FIG. 6, a current source 605, such as current DAC, may be controlled to provide the reference current. The value of the inductor current IL may be determined by sensing the actual inductor current IL, or by monitoring the input and output voltage together with an indication of average inductor current.

In the example of FIG. 6, the replica device 604 is connected in series between the reference current source 605 and ground, and the voltage at a node between the reference current source 605 and replica device 604 is monitored. If the replica device 604 is able to pass all the reference current, the voltage at the monitored node will be low, but when the reference current is greater than the current passed by the replica device 604, the voltage at the monitored node will go high.

This voltage at the monitored node thus indicates whether the reference current, is greater or lower than the current of the replica device 604, which may be used to controllably vary the drive strength for the low side switch 102. In the example of FIG. 6, this comparison is used to selectively control connection of current source 606a together with current source 601a to increase the gate charge current to provide a faster rate of turn on or the selective connection of current source 606b together with current source 601b to increase the gate discharge current to provide a faster rate of turn off.

For turn on of the low-side switch 102, only the current source 601a may be initially connected, so as to provide an initially relatively slow rate of turn on. However, once all the refence current is being passed by the replica device 604, this reference current level indicates that all the inductor current IL will be being passed by the low-side switch 102, and at this point the turn on strength of the low side switch 102 may be increased, by connecting current source 606a, to turn the low-side switch 102 on faster and reduce switch conduction losses, without, at this point, any rapid change in current in the switching paths and associated voltage spike.

FIG. 6 thus illustrates that the monitored voltage may be input to a NOR gate together with an inverted version of the turn on control signal LS_ON to control switching of the current source 606a, although it will be understood that this embodiment is just one example and other control embodiments may be used.

For turn off of the low-side switch 102, both the current sources 601b and 606b may be initially connected together to the gate, so as to provide an initially relatively fast rate of turn off. However, once all the refence current is no longer being passed by the replica device 604, this lack of reference current level indicates that all the inductor current IL will be no longer be being passed by the low-side switch 102, and at this point the turn off rate of the low side switch 102 may be decreased, by disconnecting current source 606b, to reduce the rate of turn off and limit any associated voltage spike. FIG. 6 thus illustrates that the monitored voltage may be inverted, and input to a NAND gate together with an inverted version of the turn on control signal LS_OFF to control switching of the current source 606b, although it will be understood that this embodiment is just one example and other control embodiments may be used.

FIG. 6 illustrates that the control signals LS_ON and LS_OFF may be used directly to control switching of the current sources 601a and 601b, but in practice, there may be some elements such as inverters used to equalise propagation delays with the control paths for current sources 606a and 606b.

The drive strength of the current sources 606a and 606b may be programmable and may, in some embodiments, be variable based on one or more operating parameters of the circuit, such as temperature, input voltage, output voltage or inductor current IL so as to set the rate of change of voltage of the switch node SW with regard to electromagnetic interference (EMI) performance.

In some embodiments the slew-rate of the switch transition may be dynamically controlled based on an indication of the voltage at the switching node SW.

Figure 7:
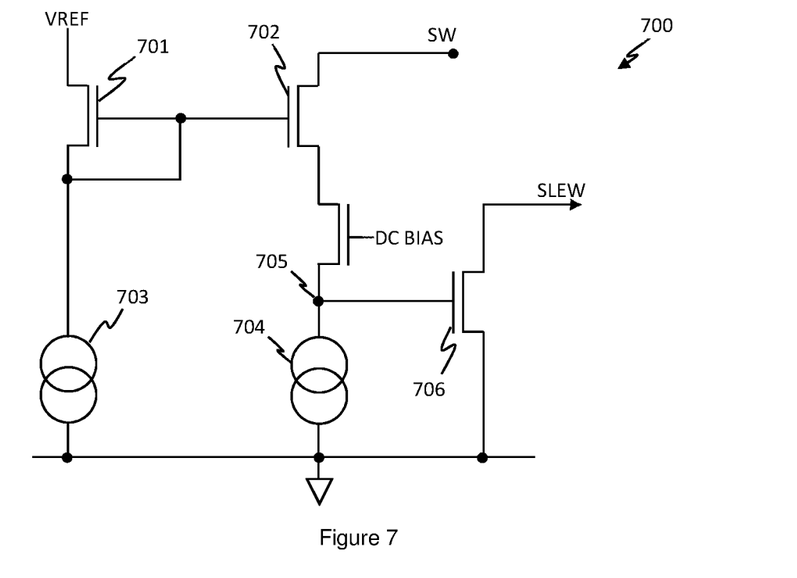
FIG. 7 illustrates an example of switch control circuitry for monitoring a voltage at the switching node.

FIG. 7 illustrates one example of a monitoring circuit 700 that effectively implements a common-gate comparator for comparing the voltage at the switching node SW with a reference VREF. Transistors 701 and 702 in respective first and second circuit branches with respective current sources 703 and 704 have a common gate tied to the first circuit branch. The fixed reference VREF is applied to the first circuit branch, and the voltage at node SW is applied to the second circuit branch. Depending on the applied voltages, there may be additional transistors in the first and second circuit branches to manage the voltage stress. If the voltage SW is greater than the reference VREF, the resulting current in the second circuit branch may be greater than the defined current of the current source 704, causing the voltage at node 705 to increase. This voltage increase causes the output transistor 706 to, in this example, pull the output low to generate a slew control signal SLEW. The slew control signal SLEW thus goes low when the voltage at the switching node SW exceeds the reference VREF. The reference VREF may be set with regard to the expected voltage at the switching node SW at the point that the relevant diode conduction begins, and may, for instance, be set with regard to the output voltage. As discussed above, for instance with respect to FIG. 5, as the low-side switch 102 turns off, the voltage at the switching node may rise until such point that the diode 101a of the high-side switch 101 becomes forward biased and starts conducting. The reference VREF may thus be set at the level which indicates diode conduction via the high-side diode 101*a* so as to just enable slew control to reduce a switch transition speed when required.

Embodiments of the present disclosure thus provide for dynamic control of switch transitions in an inductive switching circuit. By dynamically controlling the rate of at least some switch transitions, the relevant switches may be turned off or on more quickly when possible, so as to reduce power losses, whilst maintaining any induced voltage transient or stress due to the switch transition within acceptable limits. In some embodiments, the dynamic control may be based on an indication of current through a diode in one of the switching paths, which may be an inherent body diode of one of the transistor switches. In some embodiments, the onset of diode conduction when one switch is being turned on may be used to control the timing of turn on of the other switch. In some embodiments, the indication of current in a switching path may be provided by monitoring the current through a device which is a scaled replica of the relevant switch. In some embodiments, the voltage at a switching node may instead by monitored to dynamically control the switching.

The methods and apparatus of this disclosure may be applied to any inductive switching circuit, where an inductor is connected to a switching node that connects to at least two different switching paths, with the switching paths being controllably switched on and off. In particular, the methods and apparatus may be applied for switching of inductor based DC-DC converters or switching drivers such as class D amplifiers or the like.

Embodiments may be implemented as an integrated circuit, although in some embodiments the relevant inductor may or may not be integrated as part of the circuit and in some cases may be an off-chip component. Embodiments may be implemented in a host device, especially a portable and/or battery powered host device such as a mobile computing device for example a laptop, notebook or tablet computer, or a mobile communication device such as a mobile telephone, for example a smartphone. The device may be a wearable device such as a smartwatch. The host device may be a games console, a remote-control device, a home automation controller or a domestic appliance, a toy, a machine such as a robot, an audio player, a video player. It will be understood that embodiments may be implemented as part of a system provided in a home appliance or in a vehicle or interactive display. There is further provided a host device incorporating the above-described embodiments.

The skilled person will recognise that some aspects of the above-described apparatus and methods, for instance aspects of controlling the switching control signals, may be embodied as processor control code, for example on a non-volatile carrier medium such as a disk, CD- or DVD-ROM, programmed memory such as read only memory (Firmware), or on a data carrier such as an optical or electrical signal carrier. For some applications, embodiments may be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A switch driver for controlling a switch transition in an inductive switching circuit, the switch driver being configured to:
    receive an indication of current through a diode associated with a first switch; and
    dynamically control a switch transition of a second switch based on said indication of current so as to dynamically vary a time taken for the switch transition, wherein the switch transition time is varied so as to minimise the switch transition time while maintaining a voltage transient due to the switch transition within an acceptable range.

2. The switch driver of claim 1 wherein said first switch is a transistor and said diode associated with the first switch is a body diode of the first switch.

3. The switch driver of claim 1 wherein the switch driver is configured to dynamically control a slew rate of the switch transition of the second switch based on said indication of current.

4. The switch driver of claim 3 wherein said indication of current is a portion of current through the diode which is tapped from the diode.

5. The switch driver of claim 3 wherein said indication of current is fed-back in a closed loop to vary a drive strength of a drive signal applied to the second switch.

6. The switch driver of claim 5 wherein the second switch is an NMOS switch and wherein said indication of current is fed-back to a gate terminal of the NMOS switch so as to dynamically control a slew rate of turn off of the NMOS switch.

7. The switch driver of claim 1 wherein the switch driver is configured to control the timing of initiation of a turn on switch transition of one of the first and second switches based on said indication of current through said diode associated with the first switch.

8. The switch driver of claim 7 wherein the switch driver is configured to detect the onset of the current through the diode associated with the first switch to trigger said turn on switch transition of the one of the first and second switches.

9. The switch driver of claim 8 wherein the switch driver is further configured to receive an indication of current through the one of the one of the first and second switches that is triggered to turn on and wherein the switch driver is configured to dynamically control the switch transition of the second switch also based on said indication of current through the one of the one of the first and second switches that is triggered to turn on.

10. The switch driver of claim 1 wherein said switch transition of the second switch is a turn off transition and the switch driver is further configured to control the timing of initiation of a turn on switch transition of the first switch based on said indication of current through the diode associated with the first switch.

11. The switch driver of claim 1 wherein the inductive switching circuit comprises a DC-DC converter or a class-D driver.

12. A method of controlling a switch transition in an inductive switching circuit, comprising:
    providing an indication of current through a diode associated with a first switch; and
    dynamically controlling a switch transition of a second switch based on said indication of current so as to dynamically vary a time taken for the switch transition, wherein the switch transition time is varied so as to minimise the switch transition time while maintaining a voltage transient due to the switch transition within an acceptable range.

13. The method of claim 12 wherein said first switch is a transistor and said diode associated with the first switch is a body diode of the first switch.

14. The method of claim 12 wherein said indication of current is a portion of current through the diode which is tapped from the diode.

15. The method of claim 12 wherein said indication of current is fed-back in a closed loop to vary a drive strength of a drive signal applied to the second switch.

* * * * *